(12) United States Patent
Kenyon et al.

(10) Patent No.: US 6,792,430 B1
(45) Date of Patent: Sep. 14, 2004

(54) INFORMATION ORGANIZATION AND NAVIGATION BY USER-GENERATED ASSOCIATIVE OVERLAYS

(75) Inventors: Jeffrey D. Kenyon, Boulder, CO (US); Motti Goldberg, Denver, CO (US)

(73) Assignee: Qwest Communications International, Denver, CO (US)

(*) Notice: Subject to any disclaimer, the term of this patent is extended or adjusted under 35 U.S.C. 154(b) by 963 days.

(21) Appl. No.: 09/124,540

(22) Filed: Jul. 29, 1998

(51) Int. Cl.[7] .............................................. G06F 17/00
(52) U.S. Cl. ................................. 707/102; 707/103 Y
(58) Field of Search ................................. 707/102, 103, 707/104, 1–7, 103 R, 103 Y, 103 Z, 104.1; 345/333, 334, 335, 762, 765, 744

(56) References Cited

U.S. PATENT DOCUMENTS

| | | | | |
|---|---|---|---|---|
| 4,868,733 A | * | 9/1989 | Fujisawa et al. ................ | 707/5 |
| 5,159,669 A | | 10/1992 | Trigg et al. | |
| 5,250,929 A | | 10/1993 | Hoffman et al. | |
| 5,404,506 A | * | 4/1995 | Fujisawa et al. ................ | 707/4 |
| 5,473,744 A | | 12/1995 | Allen et al. | |
| 5,577,188 A | | 11/1996 | Zhu | |
| 5,602,985 A | | 2/1997 | Ishida | |
| 5,644,740 A | * | 7/1997 | Kiuchi ........................ | 395/357 |
| 5,684,969 A | | 11/1997 | Ishida | |
| 5,696,916 A | * | 12/1997 | Yamazaki et al. ........... | 345/356 |
| 5,715,416 A | | 2/1998 | Baker | |
| 5,812,134 A | * | 9/1998 | Pooser et al. ................ | 345/356 |
| 5,900,870 A | * | 5/1999 | Malone et al. .............. | 345/333 |

OTHER PUBLICATIONS

Chen et al "Automatic Construction of Networks of Concepts Characterizing Document Databases", IEEE 1992, pp. 885–902.*

Vannevar Bush, "As We May Think", *Atlantic Monthly*, Jul. 1945; 176(1), pp. 101–108.

* cited by examiner

*Primary Examiner*—Uyen Le
(74) *Attorney, Agent, or Firm*—Brooks Kushman P.C.

(57) ABSTRACT

A method of linking together digital information objects of a digital information space includes creating an overlay. The overlay includes at least one concept node, each concept node expressing one concept. A digital information object in the digital information space is accessed. The digital information object is examined to determine if at least one concept in common with concepts expressed in concept nodes is included. If the digital information object and the overlay include at least one common concept, the digital information object is automatically and dynamically linked to each concept node expressing common concepts. A user may create an information node in the overlay representing the digital information object.

20 Claims, 5 Drawing Sheets

INFORMATION ORGANIZATION AND NAVIGATION BY USER-GENERATED ASSOCIATIVE OVERLAYS

TECHNICAL FIELD

The present invention relates to organization and navigation of digital information objects of a digital information space.

BACKGROUND ART

In a data space containing hypertext such as, for example, the World Wide Web (WWW), authors link to one another's documents or pages. A user navigates through the digital information space by either following these author-defined links, searching for specific terms (as supported by search engines), or through their own "bookmarks" or pointers to specific pages.

Currently, upon locating a document the user may create a bookmark for the document. The user may then edit a description of the document (presumably, why the document is interesting) in the properties of the bookmark.

Several disadvantages are associated with the use of bookmarks for documents. For instance, the user may completely forget the existence of a relevant bookmark. Also, a user may bookmark the same document twice because the user forgot the first visit to the document. Further, some bookmarks properly belong in several categories, but to do this, the user must add the bookmarks separately to each category. If the bookmark is changed later, the user has to update each bookmark separately. Frequently, when reviewing the bookmarks, a user is at a loss as to why a particular document was marked. Finally, the collection of bookmarks can rapidly grow to an unmanageable number rendering the bookmarks useless.

In general, the user sees the digital information space as a loosely connected network in which authors link to their own documents, or the documents of other authors. What is needed is a user-driven model of organization and navigation that more closely maps to the operation of human long-term memory.

SUMMARY OF THE INVENTION

Accordingly, it is an object of the present invention to provide a method of generating a navigational model, referred to herein as an "overlay", for linking together information objects on an existing information space.

It is another object of the present invention to provide a method of generating an overlay which allows a user to create a structure of information nodes, concept nodes, and links between nodes.

It is a further object of the present invention to provide a method of generating an overlay for linking together digital information objects from a user's perspective.

It is still another object of the present invention to provide a method of generating an overlay for associating digital information objects using concept nodes to enrich navigation through a digital information space.

It is still a further object of the present invention to provide a method of generating an overlay which can be shared with other users, or combined with other overlays to create richer networks of associations.

In carrying out the above objects and other objects, the present invention provides a method of linking together digital information objects of a digital information space. The method includes creating an overlay including at least one concept node. Each concept node expresses one concept. A digital information object is accessed in the digital information space. A check is made to determine if the digital information object includes at least one concept in common with concepts expressed in the concept nodes. If the digital information object and the overlay include at least one common concept, the digital information object is automatically and dynamically linked to each concept node expressing common concepts. A user may create an information node in the overlay representing the digital information object.

In an embodiment of the present invention, a second digital information object is accessed. A check is made to determine if the second digital information object includes at least one concept in common with concepts expressed in the concept nodes. The first information object and the second information object are automatically and dynamically linked if the information node representing the first digital information object is linked to at least one concept node expressing a concept included in the second digital information object. This allows the user accessing the second information object to directly access the first information object.

In another embodiment, the digital information space is at least one of a set comprising one or more hypertext environments, one or more desktop environments, and one or more electronic mail environments. In a refinement, digital information objects are documents addressable using the Universal Resource Location (URL) specification.

In still another embodiment, the concept expressed by each concept node is described by at least one keyword. In a refinement, determining if the digital information object includes at least one concept in common with concepts expressed in concept nodes includes searching the digital information object for an occurrence of any of the keywords describing each of the concepts. In another refinement, each keyword may be a phrase and each phrase may include Boolean logical modifiers.

In yet another embodiment, the method includes allowing a user to manually establish a link between a first concept node and a second concept node, allowing the user to manually establish a link between a selected concept node and a selected information node, and allowing the user to manually establish a link between a first information node and a second information node.

In a further embodiment, the method includes allowing a user to annotate the accessed digital information object by storing the annotation in the representative information node.

A method is also provided that allows a user to organize and navigate a digital information space made up of a plurality of addressable objects. In this method, an overlay is created. Each overlay includes at least one concept with each concept described by a at least one keyword. An addressable object is accessed. The addressable object is scanned for the occurrence of each keyword. For each keyword found in the search, each concept described by the keyword is linked with the accessed addressable object. The user is permitted to add a reference to the accessed addressable object to the overlay. If the user adds the reference, the object may be linked with each concept described by the found keyword. Also, for each keyword found in the search, the concept described by the keyword is associated with the address of each added addressable object linked to any concept defined by the keyword. For each additional addressable object accessed, the object is scanned for keywords, concepts are linked for each keyword found, the user is permitted to add a reference to the object, and concepts described by found keywords are associated with the object. This allows addressable objects to be organized according to linking concepts. This also allows addressable objects to be navigated by selecting one of the added addressable objects while in the accessed addressable object, the accessed addressable object and the added addressable object having a common concept.

In an embodiment of the present invention, the user is permitted to add and delete links between any added reference to an addressable object and any concept.

In another embodiment, each addressable object added to the overlay is represented by an information node and each concept in the overlay is represented by a concept node.

In still another embodiment, a second overlay is created. Information from the first overlay may be merged into the second overlay.

In yet another embodiment, the method allows the user to order addressable objects added to the overlay to create an associative trail. The associative trail assists in navigating through the added addressable objects.

In a further embodiment, a search engine can search digital information objects. The method includes submitting the overlay to the search engine. The search engine assembles a search pattern based on concepts and keywords contained in the overlay. Information nodes already present in the overlay may be used to filter search results.

The advantages accruing to the present invention are numerous. The overlay consists of a linked network of concept and information objects that reflect the user's interest in a given area. The overlay created by a first user can be shared with a second user to allow the second user to learn or get another opinion about an area by examining a network generated by the first user. The overlay further automatically reminds a user when a new object is encountered as to how the new object relates to the other information already encountered, and allows easy access to that information.

These and other features, aspects, and embodiments of the present invention will become better understood with regard to the following description, appended claims, and accompanying drawings.

BEST MODES FOR CARRYING OUT THE INVENTION

Figure 1:
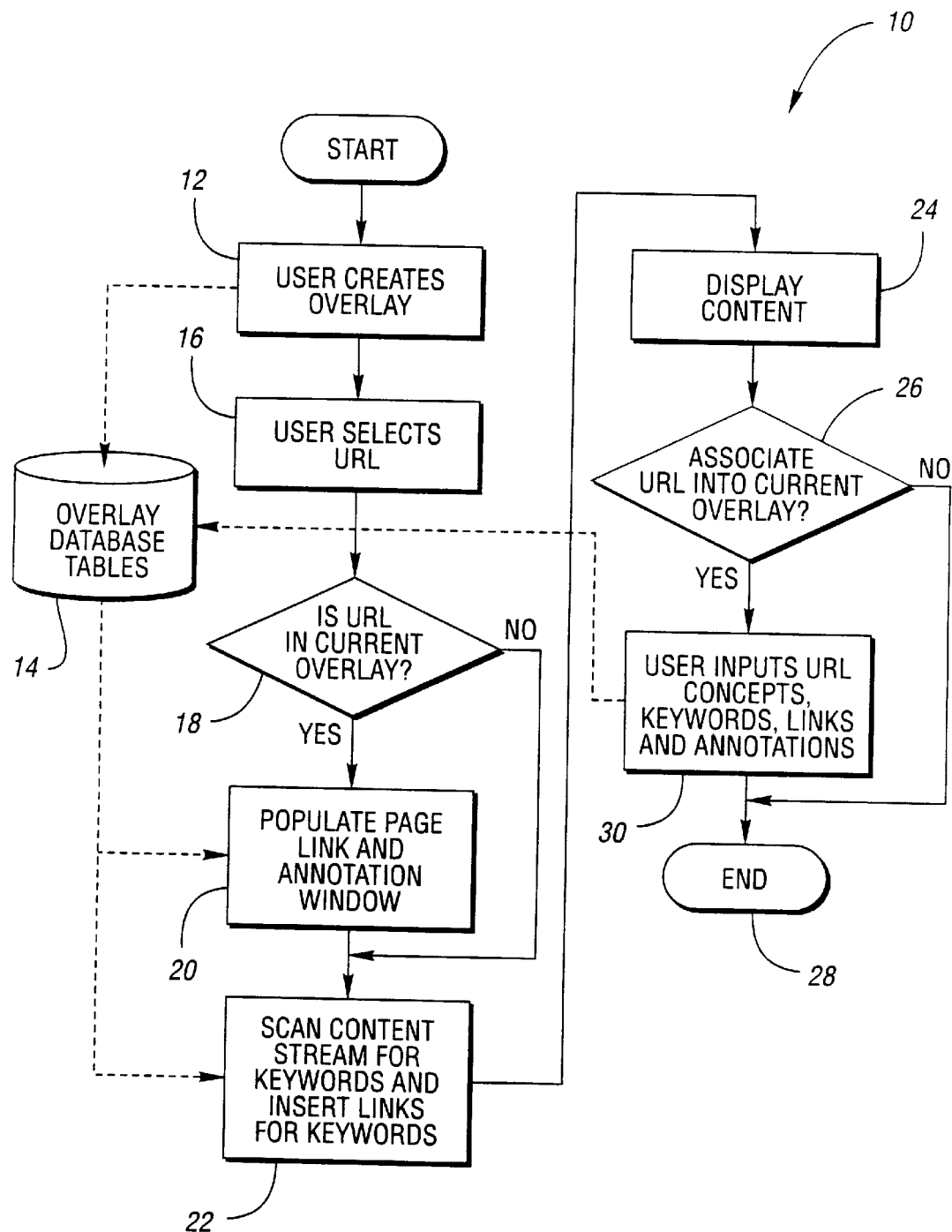
FIG. 1 is a flow diagram representing operation of the present invention.

Referring now to FIG. 1, flow diagram 10 representing operation of the present invention is shown. The present invention is preferably for use by a user traveling through a digital information space such as the World Wide Web (WWW). However, the present invention allows the user to organize and navigate any digital information space made up of addressable objects.

The user creates an overlay as shown by block 12. An overlay is a means of organizing digital information from the perspective of the user. An overlay provides a user with the means for associating digital information, such as a desired document, with concepts, keywords, other documents located on the WWW, and annotations. The overlay itself is, preferably, a locally stored software artifact such as a file or a set of tables in database 14. The overlay does not affect the digital information space directly, nor does it replicate the digital information.

There are a variety of ways in which the information of an overlay may be represented. However, the content of an overlay preferably includes an index of URLs in the overlay; an index of overlay concepts, each concept described by keywords associated with the concept; and data on each URL containing the concepts associated with an accessed document, annotations associated with the document, and user defined document links for the document. In each overlay, data associated with each URL is grouped into an information node and data associated with each concept is grouped into a concept node. Related nodes are interconnected by links. This graphical view of an overlay is further described with regards to FIG. 5 below.

A user selects a URL in block 16. An addressable object, such as a page on the WWW specified by a URL, is accessed by the user. This may occur, for example, as the user moves through the WWW with the aid of a standard browser.

A check is made to see if the URL selected is in the current overlay in block 18. If not, the content stream is scanned as described with regards to block 22 below. If so, page links and annotation windows are populated prior to scanning the contents stream. The current overlay and other overlays which have been generated in the past are stored in overlay database tables 14. The user may choose which overlay from overlay database tables 14 to designate as the current overlay.

Page link and annotation windows are populated in block 20. If the URL is associated with the current overlay, the overlay display is automatically populated with the links to other relevant documents and annotations already associated with the URL. An example of a dialog window that may be used to implement the overlay display is shown with regards to FIG. 2 below.

The content stream of the accessed document is scanned for keywords and, if keywords are found, links are inserted in block 22. Text strings within the content stream of an addressable object such as, for example, a web document, are searched for instances of keywords describing concepts associated with the current overlay. For each keyword found, an association is made to any other addressable object listed in the current overlay associated with a concept described by the found keyword.

Once scanned, the document is displayed for the user to view as shown by block 24. The user is permitted to add the URL into the current overlay in block 26. When the user adds a digital information object to the overlay, an information node representing the digital information object is created in the overlay. If the URL is not added into the current overlay then the operation of the present invention is terminated as shown by block 28. If the URL is associated into the current overlay, the user may input concepts, keywords, links to other documents relevant to the desired document, and annotations associated with the desired document as shown by block 30.

Typically, when an overlay is created, the user associates keywords with each concept. For instance, the concept "dog" may have the associated keywords "poodle" and "dalmatian." The user may link concepts to the desired document. For example, the desired document may be the "American Kennel Club" WWW homepage which may be linked to the concept "Dog". The user also may generate links to other documents relevant to the desired document. For example, the "American Kennel Club" WWW homepage may be linked in the overlay with other canine related WWW pages. Finally, the user may input annotations containing thoughts, ideas, etc., on why the desired document is interesting. For instance, the user may input "this homepage includes a directory of the American Kennel Club members."

When a document is displayed, the keywords contained in the document are highlighted to define overlay links. Various methods for highlighting are available including using a different color, changing from normal to bold, changing from normal to italics, changing the font, changing the point size, putting an outline around the keyword, or the like. The manner in which an overlay-defined link is signaled should be under the control of the user.

If the user selects a highlighted keyword in the accessed document, a pop-up menu appears. The pop-up menu includes the titles of all the documents that have been linked to the concept described by the highlighted keyword.

Thus, rather than having to make the association manually and then locate the documents related to the desired document, the association between the documents has been made automatically and dynamically. The association occurs because the accessed document expresses one or more concepts in common with the linked documents. The association is expressed in the overlay by identifying the concept nodes expressing each concept found in the accessed document and then finding the information nodes linked to the identified concept nodes. The information nodes so found are associated to the accessed document through common concepts.

Figure 2:
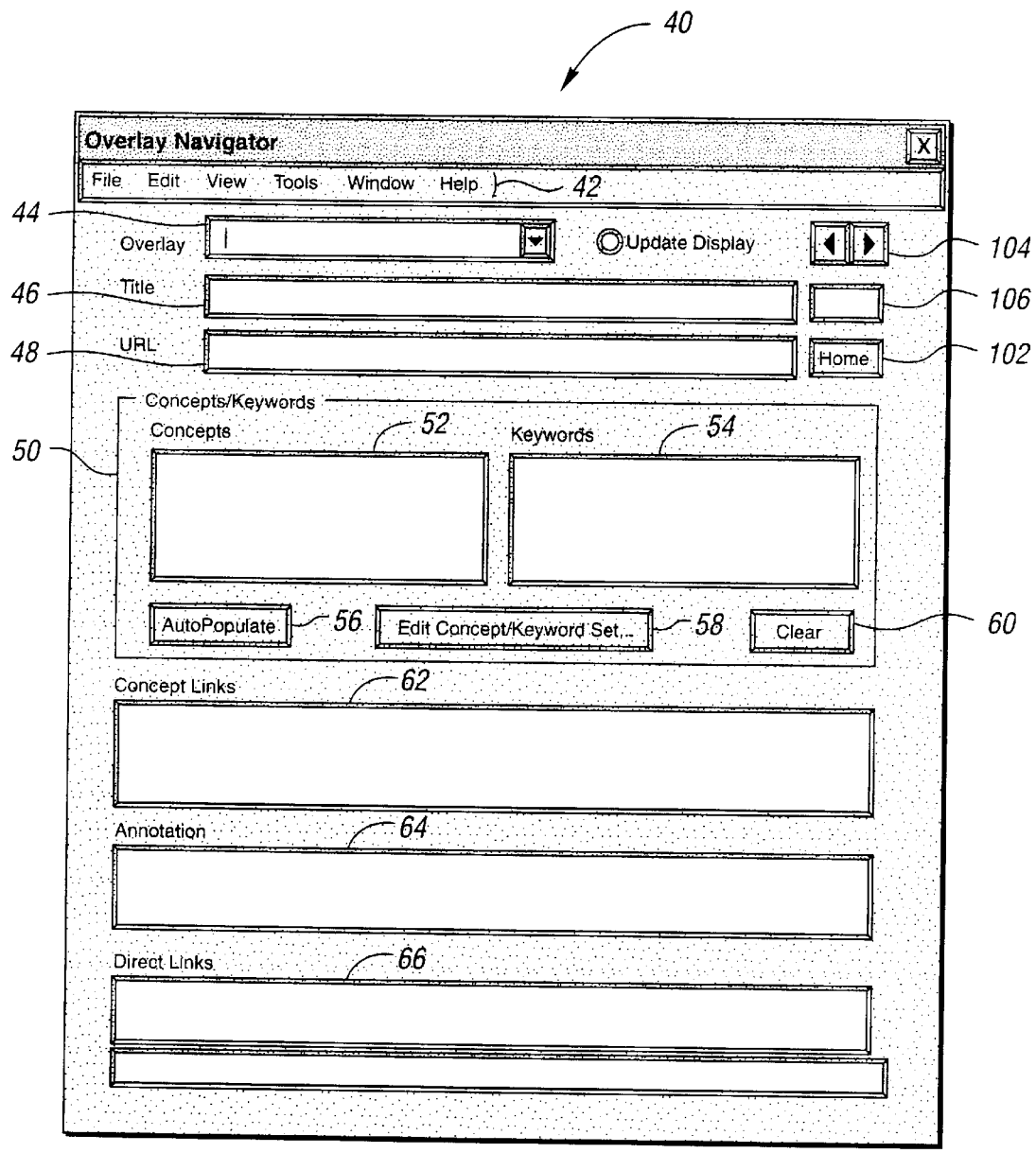
FIG. 2 illustrates a window for creating and browsing an overlay.

Referring now to FIG. 2 with continual reference to FIG. 1 overlay navigator window 40 for creating and browsing an overlay is shown. Window 40 is preferably part of the browser used by a user to travel through the digital information space. The user invokes a command to bring up window 40 to create an overlay. This procedure is related to the procedure described above with regard to block 12 of FIG. 1.

Window 40 includes menu bar 42 and overlay name input box 44. As part of information node creation, the user enters a name for the overlay in overlay name input box 44. Window 40 further includes concepts/keywords area 50 having concepts area 52, keywords area 54, edit concept/keyword set button 58, and clear button 60.

Figure 3:
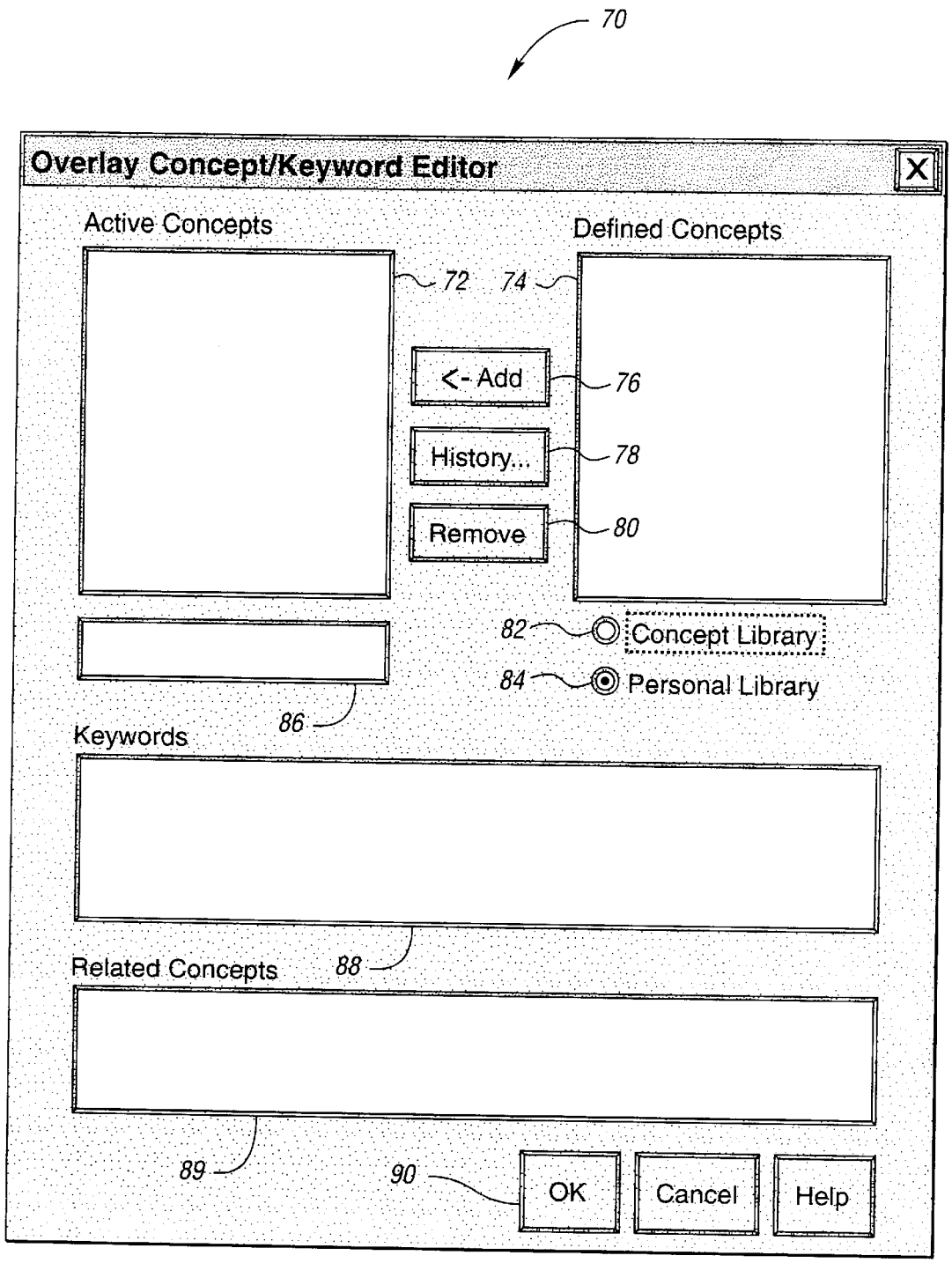
FIG. 3 illustrates a dialog for adding or modifying concept nodes and associated keywords.

After entering a name in overlay name input box 44, the user activates edit concept/keyword set button 58 to bring up dialog 70 shown in FIG. 3. The user uses dialog 70 for associating concepts and keywords with the overlay. Dialog 70 includes active concepts area 72, defined concepts area 74, add button 76, history button 78, and remove button 80. Dialog 70 further includes concept library radio button 82, personal library radio button 84, and active concept input area 86. Finally, dialog 70 includes keywords area 88 and related concepts area 90.

Initially, the user may activate concept library radio button 82 to bring up a list of predefined concepts in defined concepts area 74. Each of the predefined concepts in defined concepts area 74 include associated keywords listed in keywords area 88. The user may click on a concept listed in defined concepts area 74 and then click add button 76 to list the chosen concept in active concepts area 72. The user may add other concepts listed in defined concepts area 74 to active concepts area 72. Similarly, the user may remove concepts listed in active concepts area 74 by clicking on a concept and then clicking remove button 80.

In addition to choosing from predefined concepts to associate with the desired document, the user may add personally defined concepts to active concepts area 72. To do this, the user initially clicks on personal library radio button 84, then types a concept within active concept input area 86, then types keywords to be associated with the concept within keywords area 88, and then clicks add button 76. As an example, the user may define the concept "scottish fold" with the keywords "scottish fold" and "folded ear."

Preferably, Boolean logic modifiers can be employed when associating keywords with concepts. For instance, the user may define the concept "poodle" with the keyword "poodle", but not the keyword "poodle skirt" by typing "NOT poodle skirt" within keywords area 86.

After entering concepts and associated keywords for the desired document into the various input boxes of dialog 70, the user clicks an OK button 90 to move back to window 40.

Window 40 may also be used to create new information and concept nodes. This function may be associated with block 30 in FIG. 1 above. To support this functionality, window 40 includes title input box 46, URL input box 48, autopopulate button 56, concepts link area 62, annotation area 64, and direct links area 66.

If window 40 is open when the user accesses a document, the title of the accessed document is automatically entered into title input box 46 and the URL of the document is automatically entered into URL input box 48. The user may now add concept links to concept links area 62, annotations to annotations area 64, and direct links to direct links area 66 for the desired document. A concept link is a link between two concept nodes within an overlay. A direct link is a user defined link from one document to another document.

Instead of manually associating concepts and keywords with the accessed document by clicking edit/concept keyword set button 58, the user may click autopopulate button 56 to do this automatically. An advantage of the present invention is that the browser examines the textual content of the document when the user clicks autopopulate button 86 to look for keywords or keyword synonyms stored in the overlay that are also in the document. The present invention uses keywords to identify concepts present in the text and suggests associating the document with those concepts. The user may agree to this and then decide to edit the concepts and keywords further by clicking edit concept/keyword set button 58. The user may also edit the concept links, the annotations, and the direct links as desired. In an embodiment of the present invention, a thesaurus is included. The document search could then include common synonyms for keywords. This feature may be under user control since the synonyms may generate false positive matches that are less likely to correspond to what the user is considering.

A further advantage of the present invention is that the browser highlights found keywords in the document to defined overlay links. When the user moves a pointer over a found keyword, a menu appears showing all documents that have been linked to the concept associated with the matched keyword. In essence, the association between documents has been done automatically and dynamically rather than manually. Thus, instead of the user attempting to remember a relevant document that has been bookmarked and then wade through the bookmark folder hierarchy, the presence of keywords has already activated the relevant concepts and generated a menu of links.

In a preferred embodiment, concepts area 52 of dialog 40 shows a strength of association of concepts with the document. The strength of association may be shown by sorting the concepts, by placing a numeric value next to the concept, or the like. The user should be able to select the method of indicating strength of association.

Another advantage of the present invention is that the overlay can be shared with others. For instance, the overlay is downloadable in the same manner as any other file and may be made globally available on the WWW. Further, overlays are additive, they may be combined automatically or selectively.

Overlays may have a defined starting point. This provides the user with a trailhead from which exploration may begin. A user creating an overlay with the intent to share may place trail markers on individual links (this would presumably be done via the overlay dialog for a specific document). By invoking a "next" command, an individual viewing another user's overlay can be taken on a guided tour of the associative trail.

To get to the starting point of an overlay, the user would click home button 102 of dialog 40. The user can flip back and forward through the links by clicking arrow buttons 104. A display 106 shows a sequence number as the user moves through the links.

Figure 4:
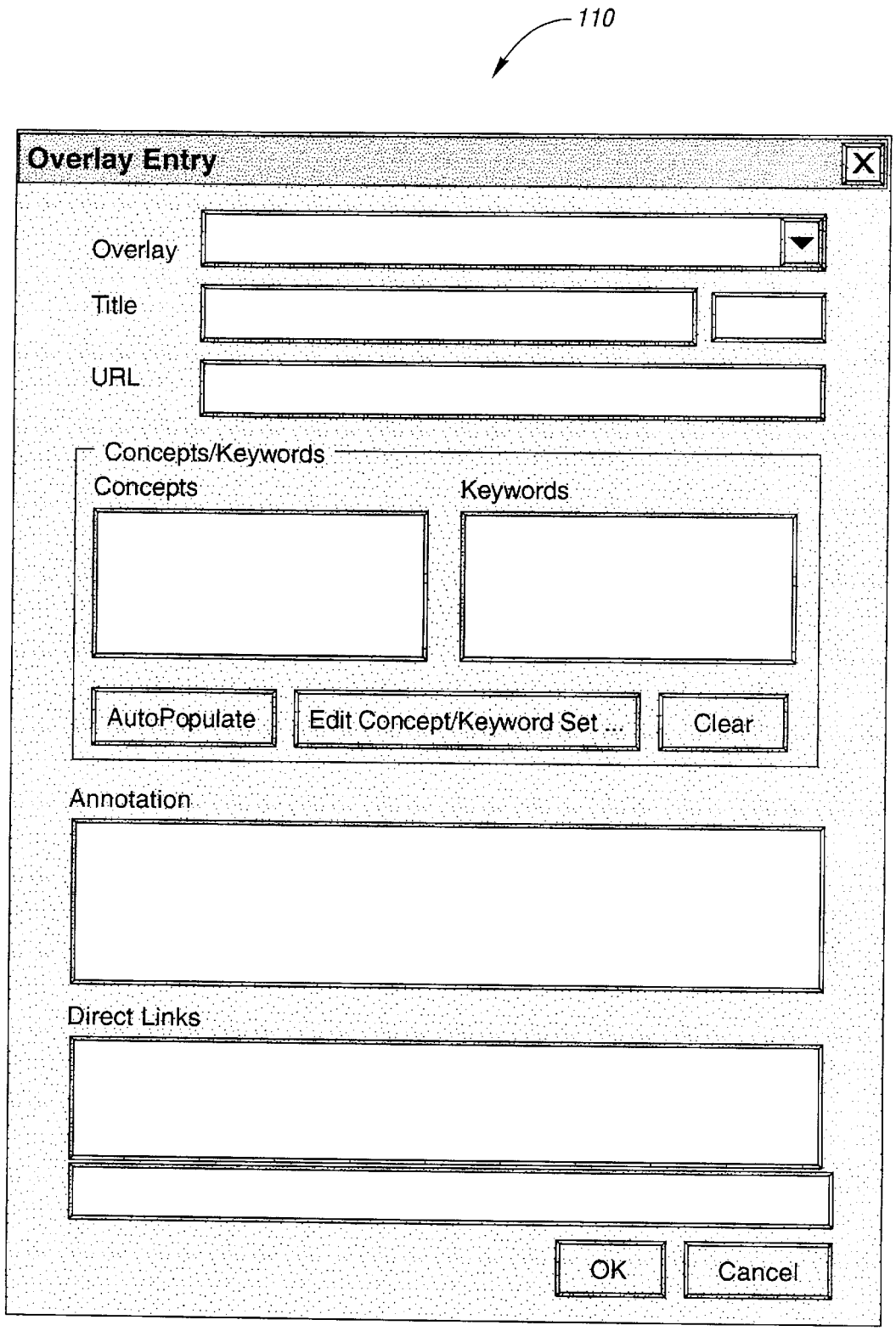
FIG. 4 illustrates a dialog for adding or modifying information nodes.

Referring now to FIG. 4, a dialog for adding a node to an overlay is illustrated. Window 40 is designed to be the user interface for a stand alone application. In an embodiment, some or all of the present invention may be incorporated into a standard browser. A dialog, such as dialog 110, may be popped up from within the browser to provide access to choose and options described above. Dialog 110 permits the creation and editing of an information or concept node from within the browser.

The overlay makes the entire digital information space significantly more usable for individuals and work groups, yet without requiring changes to that information space. Information providers could create enhanced documents that come predefined with associative keywords or general links built in; users would selectively decide which keywords or links to import into their own overlay, or could reject all author suggestions and link it in some other, unique manner.

Figure 5:
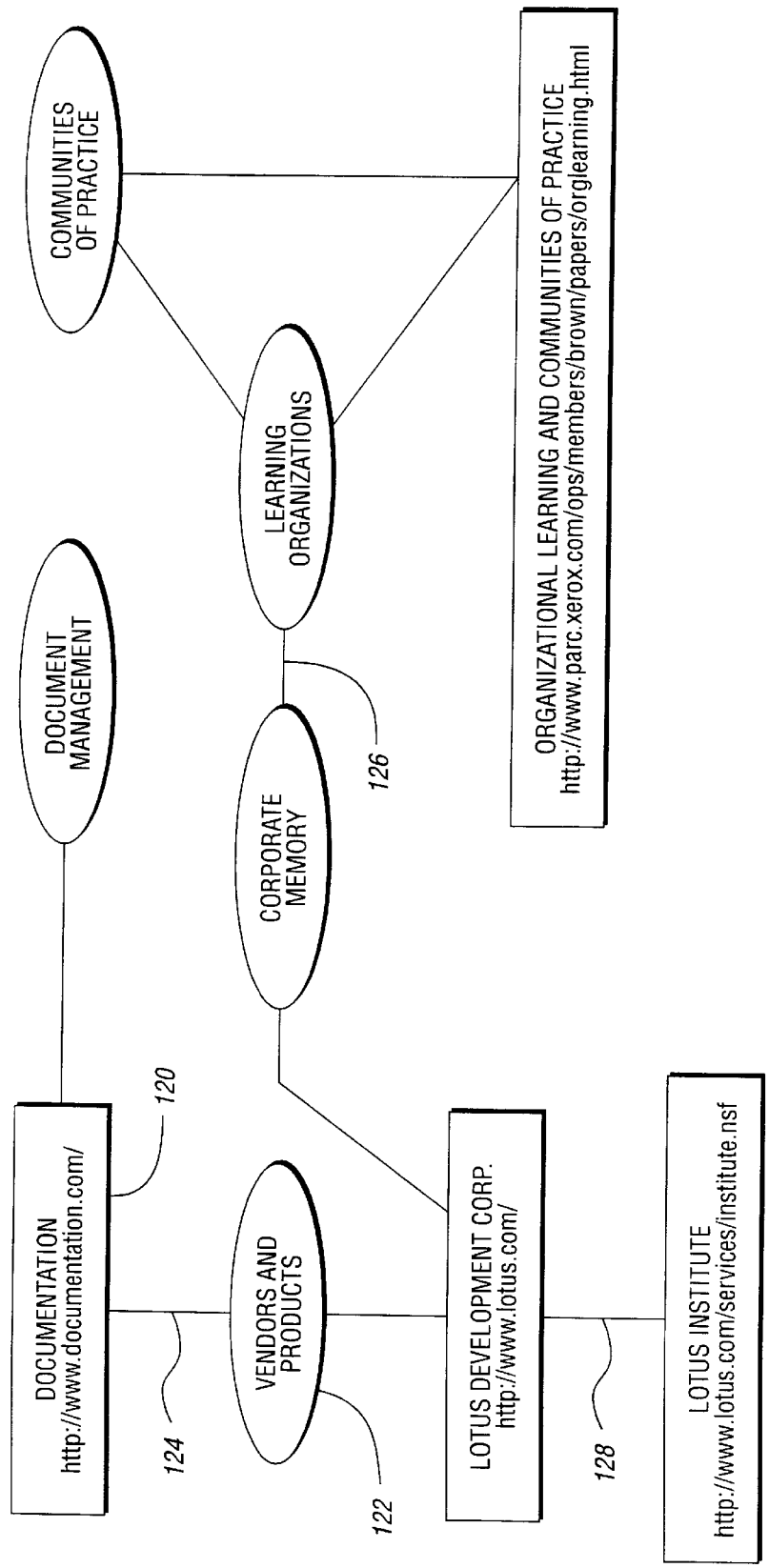
FIG. 5 illustrates an exemplary display of information nodes, concept nodes, and links between nodes.

Referring now to FIG. 5, an illustration of an exemplary display including information nodes, concept nodes, and associated links is shown. In a preferred embodiment of the present invention, a user can obtain a graphical image of relationships held within the overlay. Information nodes, one of which is shown by 120 and concept nodes, one of which is shown by 122, are connected by links. Information-concept links, one of which is indicated by 124, indicate information nodes 120 which contain keywords defining associated concept 122. Information-concept links may be manually established by the user or may be automatically generated. Concept-concept links, one of which is shown by 126, connect concept nodes 122. These connections are manually defined by the user. Information-information links, one of which is indicated by 128, indicate links from one information node to another that have been manually established by the user.

In an embodiment of the present invention, an overlay is submitted to a search engine modified to accept overlays. The search engine uses the concept nodes and their keywords to assemble finely detailed and optimized search patterns. Information nodes already stored in the overlay could be used to further refine the search. A user would examine the search results and decide on a case-by-case basis which new information nodes should be added to the overlay. This may be used, for example, as a proactive alternative to or augmentation of individual searches performed at the time of need. As such, the overlay could be uploaded to a search engine on a regular basis.

Thus it is apparent that there has been provided, in accordance with the present invention, a method of generating an overlay for linking together desirable information objects on an existing information space that fully satisfies the objects, aims, and advantages set forth above.

While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

For instance, in addition to using overlays for the organization and navigation of WWW documents, the overlays can be used for organizing email. In operation, when a user encounters an email that is to be saved, rather than moving the email to a folder, the user would open an overlay dialog and select the concepts by which the email should be indexed. The user would be able to browse through the concepts and view which messages are relevant to which concepts. In addition, new email could be scanned for keywords and then linked to other email having the concepts associated with the matched keywords.

As another example, the digital information space may be a desk top environment. In this case, the addressable objects include each addressable location accessible from the desk top environment. These objects include WWW sites, emails, local documents, shared network files, and the like.

Other applications for the present invention include database entries as may be specified by an SQL query, a slide in a presentation program file, a sheet in a spreadsheet, and the like. A digital information object is anything on a computer that can be uniquely addressed.

What is claimed is:

1. A method of linking together digital information objects of a digital information space comprising:

creating an overlay comprising at least one concept node, each concept node expressing one concept;

accessing a digital information object in the digital information space;

determining if the digital information object includes at least one concept in common with concepts expressed in the at least one concept node;

if the digital information object and the overlay include at least one common concept, automatically and dynamically establishing a link between the digital information object and each concept node expressing one of the at least one common concept; and permitting a user to create an information node in the overlay representing the digital information object.

2. The method of claim 1 wherein the digital information object is a first digital information object, the method further comprising:

accessing a second digital information object in the digital information space;

determining if the second digital information object includes at least one concept in common with concepts expressed in the at least one concept node; and automatically and dynamically linking the first information object and the second information object if the information node representing the first digital information object is linked to at least one concept node expressing a concept included in the second digital information object;

thereby allowing the user accessing the second information object to directly access the first information object.

3. The method of claim 1 wherein the digital information space is at least one of a set comprising at least one hypertext environment, at least one desktop environment, and at least one electronic mail (email) environment.

4. The method of claim 1 wherein the digital information objects are documents addressable using the Universal Resource Locator (URL) specification.

5. The method of claim 1 wherein the concept expressed by each concept node is described by at least one keyword.

6. The method of claim 5 wherein determining if the digital information object includes at least one concept in common with concepts expressed in the at least one concept node comprises searching the digital information object for an occurrence of any of the at least one keyword describing each of the at least one concepts.

7. The method of claim 5 wherein each of the at least one keyword may be a phrase, and wherein each phrase may include Boolean logical modifiers.

8. The method of claim 1 wherein the at least one concept node is a plurality of concept nodes and wherein the overlay comprises a plurality of information nodes, each information node representing a digital information object, the method further comprising:

allowing the user to manually establish a link between a first concept node and a second concept node;

allowing the user to manually establish a link between a selected concept node and a selected information node; and allowing the user to manually establish a link between a first information node and a second information node.

9. The method of claim 1 further comprising allowing the user to annotate the accessed digital information object by storing the annotation in the representative information node.

10. A method of allowing a user to organize and navigate a digital information space, the digital information space comprising a plurality of addressable objects, the method comprising:

creating an overlay, the overlay comprising at least one concept, each concept described by at least one keyword;

accessing an addressable object;

scanning the accessed addressable object for occurrences of each keyword;

for each keyword found in the search, linking each concept described by the found keyword with the accessed addressable object;

permitting the user to add a reference to the accessed addressable object to the overlay and, if the user adds the reference, linking the reference with each concept described by the found keyword;

for each keyword found in the search, associating the concept described by the found keyword with the address of each added addressable object linked to any concept described by the found keyword; and repeating scanning the accessed addressable object, linking each concept for each keyword found, permitting the user to add a reference to the accessed addressable object, and associating the concept described by the found keyword, for each addressable object accessed;

whereby the addressable objects are organized according to linking concepts, and whereby the addressable objects are navigated by selecting one of the added addressable objects while in the accessed addressable object, the accessed addressable object and each of the added addressable objects having a common concept.

11. A method of allowing a user to organize and navigate a digital information space as in claim 10 further comprising permitting the user to add and delete links between any added reference to an addressable object and any concept.

12. A method of allowing a user to organize and navigate a digital information space as in claim 10 further comprising:

representing each reference to an addressable object added to the overlay by an information node; and representing each concept in the overlay by a concept node.

13. A method of allowing a user to organize and navigate a digital information space as in claim 12 further comprising:

allowing the user to manually link a first concept node and a second concept node;

allowing the user to manually link a selected concept node and a selected information node; and allowing the user to manually link a first information node and a second information node.

14. A method of allowing a user to organize and navigate a digital information space as in claim 10 wherein the digital information space is the World Wide Web (WWW) and wherein each addressable object address conforms to the Universal Resource Locator (URL) specification.

15. A method of allowing a user to organize and navigate a digital information space as in claim 10 wherein the digital information space is a desktop environment and wherein the plurality of addressable objects comprises each addressable location accessible from the desktop environment.

16. A method of allowing a user to organize and navigate a digital information space as in claim 10 wherein the digital information space is an electronic mail (email) environment and wherein each addressable object is an email message.

17. A method of allowing a user to organize and navigate a digital information space as in claim 10 further including permitting the user to annotate the accessed addressable object.

18. A method of allowing a user to organize and navigate a digital information space as in claim 10 wherein the overlay is a first overlay, the method further comprising:

creating a second overlay; and merging the information from the first overlay into the second overlay.

19. A method of allowing a user to organize and navigate a digital information space as in claim 10 further comprising allowing the user to order the at least one added addressable object to create an associative trail whereby the trail assists in navigating through the added addressable objects.

20. A method of allowing a user to organize and navigate a digital information space as in claim 10 wherein a search engine is operable to search digital information objects, the method further comprising submitting the overlay to the search engine, the search engine assembling a search pattern based on the at least one concept.

* * * * *